UNITED STATES PATENT OFFICE.

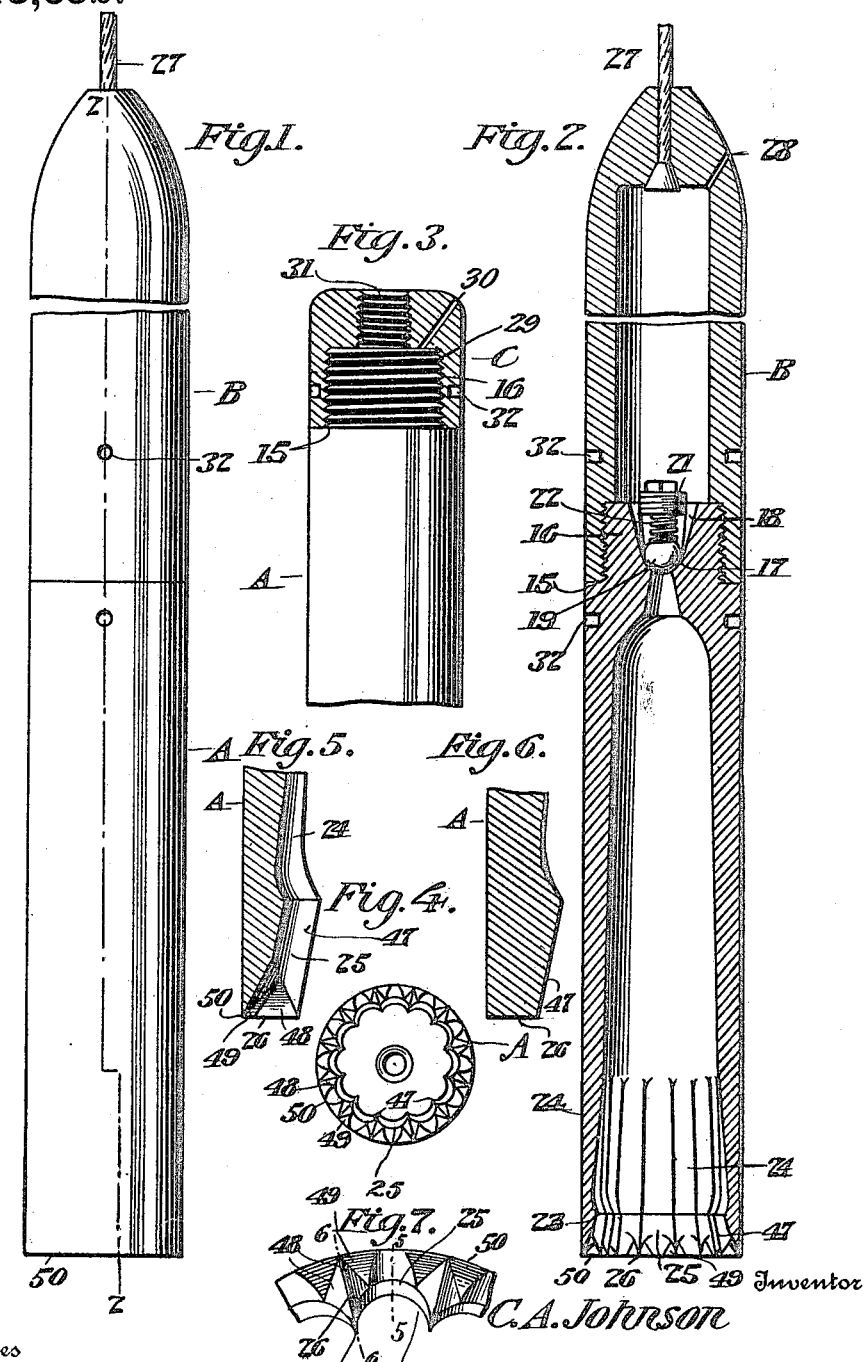

CHRISTIAN A. JOHNSON, OF LARAMIE, WYOMING, ASSIGNOR OF ONE-FOURTH TO JOHN WAIDELE, OF LARAMIE, WYOMING.

TUBULAR DRILL.

1,213,652.     Specification of Letters Patent.     Patented Jan. 23, 1917.

Application filed October 13, 1916. Serial No. 125,443.

*To all whom it may concern:*

Be it known that I, CHRISTIAN A. JOHNSON, a citizen of the United States, residing at Laramie, in the county of Albany and State of Wyoming, have invented new and useful Improvements in Tubular Drills, of which the following is a specification.

This invention relates to well drills, and it has for its object to produce a drill of simple and improved construction which will be suitable for use either as a machine or as a hand drill.

The invention has for its object to produce a tubular drill which will be equipped with means for exhausting air from the upper portion thereof in which said upper portion a partial vacuum will thus be formed so that the atmospheric pressure will operate to retain within the lower portion of the tubular drill material which is loosened thereby in the act of drilling.

A further object of the invention is to provide a tubular drill with an automatic valve and an air outlet of simple and improved construction to permit air to escape from within the tubular drill.

A further object of the invention is to produce a simple and improved coupling device adapted to operate in conjunction with the improved drill.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—Figure 1 is a side elevation of a drill constructed in accordance with the invention, showing also the superposed tubular coupling member. Fig. 2 is a vertical sectional view taken on the line 2—2 in Fig. 1. Fig. 3 is a sectional elevation of the drill showing a coupling member which is applied when the device is to be utilized as a hand drill. Fig. 4 is a bottom end view of the improved drill. Fig. 5 is a sectional detail view taken on the line 5—5 in Fig. 7. Fig. 6 is a sectional detail view taken on the line 6—6 in Fig. 7. Fig. 7 is a fragmentary bottom end view on an enlarged scale.

Corresponding parts in the several figures are denoted by like characters of reference.

The drill A is of tubular construction, the same being constricted at its upper end to form a shoulder or offset 15 and a threaded shank 16, the bore of the latter being formed with a valve seat 17 near the lower end thereof, and said bore being provided with grooves or channels 18 extending upwardly from the valve seat to form air outlets. A ball valve 19 made preferably of rubber or of material coated with rubber engages the valve seat so as to form an air tight closure. The upper extremity of the bore 20 of the shank is internally threaded for the reception of a screw cap 21, and a spring 22 may be interposed between the screw cap and the valve to assist in seating the latter. The screw cap 21 obviously must not obstruct the air outlets 18.

A portion of the drill near the lower end thereof is slightly thickened or reinforced, as seen at 23, and it is provided internally with vertically disposed grooves 24 merging at their upper ends with the bore of the drill cylinder. The lower extremity of the drill cylinder is formed with a circumferential series of approximately semi-circular cavities 25 merging at their upper ends with the lower ends of the grooves 24. The ribs 47 intermediate the grooves 24 are beveled on the sides thereof, as seen at 48, to produce cutting edges 26 that are disposed radially with respect to the axis of the drill. The edge of the lower extremity of the drill is also provided with beveled portions 49 intermediate the beveled faces 48 of the ribs and the cavities 25, producing a circumferential cutting edge 50. In this manner the drill is equipped with an exceedingly efficient cutting face having a tendency when the drill, in operation, is rotated about its vertical axis to work the loose material into the bore of the drill where it will gradually accumulate.

When the drill is to be used as a machine drill, it is connected with a coupling member which is shown at B in Figs. 1 and 2, said coupling member being of tubular form and internally threaded at its lower end so as to engage the threaded shank 16 and to abut on the shoulder 15 of the drill. The upper end of the coupling member B is connected in any convenient manner with the drill cable 27, and it has an air outlet 28.

A coupling member C, which is employed when the drill is used as a hand drill, consists simply of a cap internally threaded at 29 for engagement with the threaded shank 16 and having also an air outlet 30 and a reduced threaded opening 31 for the reception of a handle whereby it may be manipulated. The coupling members B and C, as well as the drill A, are provided with spanner holes 32.

In the operation of the improved drill, at each stroke a portion of the loosened material will be forced upwardly within the bore of the drill, and the material thus forced upwardly in the drill bore, aided by the concussion of the stroke, will operate to compress the air in the drill bore below the valve 19, unseating the latter and permitting the air to pass through the outlets 17 before the valve is reseated, partly by gravity and partly by the action of the spring 22. The partial vacuum thus formed in the upper portion of the drill bore will assist in retaining the material accumulated in the latter, not only when the drill descends, but also when the drill is withdrawn for the purpose of removing the accumulated material. The tubular coupling member B is of such dimensions that it will gravitationally assist the operation of the drill, but being provided with an air outlet 28, it will not obstruct the escape of air. The coupling member C may be conveniently used when the drill is used as a hand drill.

Having thus described the invention, what is claimed as new, is:—

1. A tubular drill having a reduced externally threaded shank at its upper end, the bore of said shank being provided with a valve seat and with grooves forming air outlets, a ball valve engaging the seat, and a threaded cap forming a closure for the valve chamber.

2. A tubular drill having a reduced externally threaded shank, the bore of which constitutes a valve chamber, an upwardly opening valve in said chamber, a closure at the upper end of the valve chamber, said chamber having grooves that constitute air outlets unobstructed by the closure.

3. A tubular drill having a reduced externally threaded shank, the bore of which constitutes a valve chamber, an upwardly extending valve in said chamber, a closure at the upper end of the valve chamber, said chamber having grooves that constitute air outlets unobstructed by the closure, in combination with a coupling member of tubular form internally threaded at its lower end to engage the threaded shank and having an air outlet at its upper end.

4. A tubular drill having a bore provided at its lower end with grooves merging with the bore at their upper ends, the lower end of said drill having a circumferential series of approximately semi-circular recesses merging with the grooves, the ribs intermediate the grooves being beveled at their lower ends, producing cutting edges that are radially disposed with respect to the axis of the drill.

5. A tubular drill having a bore provided at its lower end with grooves merging with the bore at their upper ends, the lower end of said drill having a circumferential series of approximately semi-circular recesses merging with the grooves, the ribs intermediate the grooves being beveled at their lower ends, producing cutting edges that are radially disposed with respect to the axis of the drill, the lower edge portion of the drill being also beveled to form faces intermediate the beveled faces at the lower ends of the ribs and semi-circular recesses, forming a circumferential cutting edge.

In testimony whereof I affix my signature.

CHRISTIAN A. JOHNSON.